United States Patent [19]

Pendergraft

[11] Patent Number: 5,141,733

[45] Date of Patent: * Aug. 25, 1992

[54] HIGH PRESSURE-LOW PRESSURE STEAM SYSTEM FOR EXTENDED CLAUS SULFUR RECOVERY PLANT

[76] Inventor: Paul T. Pendergraft, 4702 Hickory Downs, Houston, Tex. 77084

[*] Notice: The portion of the term of this patent subsequent to May 14, 2008 has been disclaimed.

[21] Appl. No.: 444,080

[22] Filed: Nov. 30, 1989

[51] Int. Cl.$^5$ .................. C01B 17/04; B01J 8/04; B01J 12/02

[52] U.S. Cl. ................ 423/574 R; 422/115; 422/116; 422/171; 422/190; 423/576.2

[58] Field of Search .............. 422/160, 187, 190, 115, 422/116, 171, 576.2; 423/574 R

[56] References Cited

U.S. PATENT DOCUMENTS

| | | | |
|---|---|---|---|
| Re. 288,305 | 5/1976 | Hunt, Jr. et al. | 423/422 |
| 2,767,062 | 10/1956 | Duecker | 23/226 |
| 3,702,884 | 11/1972 | Hunt, Jr. et al. | 423/222 |
| 3,749,762 | 7/1973 | Montgomery | 423/574 |
| 3,758,676 | 9/1973 | Goddin, Jr. et al. | 423/573 |
| 4,035,474 | 7/1977 | Kunkel et al. | 423/574 |
| 4,124,696 | 11/1978 | Kunkel | 423/574 |
| 4,180,554 | 12/1979 | Goddin, Jr. et al. | 423/574 |
| 4,315,904 | 2/1982 | Lell et al. | 423/574 |
| 4,391,790 | 7/1983 | Palm et al. | 423/574 |
| 4,391,791 | 7/1983 | Palm et al. | 423/574 |
| 4,426,369 | 1/1984 | Palm | 423/574 |
| 4,430,317 | 2/1984 | Reed et al. | 423/574 |
| 4,462,977 | 7/1984 | Reed | 423/574 |
| 4,473,541 | 9/1984 | Palm | 423/574 |
| 4,482,532 | 11/1984 | Cabanaw | 423/574 |
| 4,483,844 | 11/1984 | Cabanaw | 423/574 |
| 4,487,754 | 12/1984 | Reed | 423/574 |
| 4,507,275 | 3/1985 | Reed | 423/574 R |
| 4,508,698 | 4/1985 | Reed | 423/574 |
| 4,526,590 | 7/1985 | Palm et al. | 55/27 |
| 4,601,330 | 7/1986 | Palm et al. | 165/95 |
| 4,643,888 | 2/1987 | Palm | 423/574 |
| 4,756,900 | 7/1988 | Pendergraft et al. | 423/574 |
| 4,822,591 | 4/1989 | Reed et al. | 423/574 R |
| 5,015,459 | 5/1991 | Pendergraft | 423/574 R |
| 5,015,460 | 5/1991 | Pendergraft | 423/574 R |

FOREIGN PATENT DOCUMENTS 938087 12/1973 Canada .................. 23/332
2708012 9/1977 Fed. Rep. of Germany ...... 423/574

OTHER PUBLICATIONS

Delta Engineering Corp., "Delta is ... Sulfur Recovery".
A. B. Coady, "MCRC Process for Improving Claus Plant Recovery", Jun. 9, 1976.
A. B. Coady and R. E. Heigold, "The MCRC Sub--Dewpoint Claus Process", Sep. 14, 1983.
R. E. Heigold and D. E. Berkeley, "Pine River Uses Four-Converter MCRC", Sep. 12, 1983.
Enstar Engineering Co., "MCRC Sulfur Recovery Process", Feb. 26, 1985.
R. E. Heigold and D. E. Berkeley, "The MCRC Sub--Dewpoint Sulphur Recovery Process", Mar. 1983.

*Primary Examiner*—Gary P. Straub

[57] ABSTRACT

A high pressure to low pressure transition in the steam production within sulfur condensers feeding cold bed adsorption reactors in an extended Claus process sulfur recovery plant is prevented from affecting recovery by maintaining a sufficiently cold reactor in final position to absorb potentially emissions affecting increase in final reactor feed temperature.

3 Claims, 2 Drawing Sheets

FIG. 1 — Prior Art

HIGH PRESSURE-LOW PRESSURE STEAM SYSTEM FOR EXTENDED CLAUS SULFUR RECOVERY PLANT

FIELD OF THE INVENTION

The invention relates to producing low pressure and high pressure steam in extended Claus sulfur recovery plants of the type having at least three reactors each periodically alternated between operation under high temperature Claus conditions and operation under cold bed adsorption (CBA) conditions. In a particular aspect, the invention relates to preventing a high pressure to low pressure transition in the steam side of a sulfur condenser from resulting in a pressure surge within a low pressure steam delivery system which affects emissions by accomplishing the transition in a non-emissions-affecting position at a non-emissions-affecting rate and by maintaining a sufficiently cold Claus catalyst bed in a final position to absorb heat while a newly regenerated reactor is being cooled to CBA conditions.

SETTING OF THE INVENTION

An extended Claus sulfur recovery plant comprises one or more catalytic reactors operated under high temperature Claus conditions in series with one or more catalytic reactors operated under cold bed adsorption (CBA) conditions. Under effective high temperature Claus conditions, sulfur formed in presence of Claus catalyst is continuously withdrawn from a reactor in vapor phase and condensed in a sulfur condenser and removed as liquid sulfur. Under effective CBA conditions, including temperature, a preponderance of sulfur formed is deposited and accumulated on the Claus catalyst. The sulfur is periodically removed during regeneration by effective high temperature gas flowing through the reactor and vaporizing sulfur which is withdrawn in vapor phase from the reactor and condensed in a sulfur condenser and removed as liquid sulfur. High temperature Claus operation can occur concurrently with regeneration of catalyst in a reactor previously operated under CBA conditions.

Besides producing liquid sulfur, shell-and-tube indirect heat exchangers used as sulfur condensers produce useful steam. In such exchangers, boiler feed water in the shell side is converted to steam while in the tube side process gas containing sulfur vapor is cooled and sulfur is condensed and removed. For purposes of discussion, steam production on the shell side and gas cooling and sulfur condensation on the tube side is assumed; however, steam production on the tube side and gas cooling and sulfur condensation on the shell side can also be used.

Where the process gas after cooling is above about 300° F., high pressure steam, (for example 60 psig) can be produced. When the process gas after cooling is below about 300° F. down to about 260° F., only low pressure steam (for example, 15 psig) can be produced. High pressure steam has many uses in plants and represents significant economic advantage relative to low pressure steam which has fewer applications. It is desirable to maximize high pressure steam production and to produce low pressure steam only when high pressure steam cannot be produced consistent with efficient and cost effective design and operation of the sulfur plant.

In extended Claus processes, sulfur condensers cooling gas for introduction into CBA reactors typically operated at temperatures less than about 300° F. during adsorption can produce only low pressure steam whereas sulfur condensers feeding high temperature Claus reactors or "warm" CBA reactors can be used to produce high pressure steam. When a reactor is alternated between "warm" and "cool" CBA and high temperature Claus operations concurrent with regeneration, a condenser feeding that reactor sometimes produces low pressure steam and sometimes produces high pressure steam.

In the type of extended Claus sulfur recovery plant in which three or more reactors are each periodically alternated between CBA and high temperature Claus conditions, conventional plant design associates a sulfur reactor with its downstream condenser and rotates the reactor/condenser pair as a reactor/condenser unit. Such a plant is shown in FIG. 1—PRIOR ART in which letters A, B, C indicate generally three such reactor/condenser units. TABLE A indicates reference numerals in FIG. 1 for easy identification.

TABLE A

| Symbol | Refers To |
|---|---|
| FURN/WHB | Claus furnace (FURN) with waste heat boiler (WHB) |
| $C_F$ | Furnace sulfur condenser |
| $V_a$ | WHB bypass reheat valve |
| $R_v$ | Claus reactor (dedicated to high temperature Claus operation) |
| $C_v$ | Claus reactor condenser |
| $V_b$ | Claus reactor condenser bypass reheat valve |
| A | Claus/CBA Reactor Unit A |
| B | Claus/CBA Reactor Unit B |
| C | Claus/CBA Reactor Unit C |
| 1,1' | Process gas supply to reactor unit from $C_v$ or another reactor or reactor unit |
| 2 | Alternate process gas supply to reactor unit from another reactor unit |
| 3 | Reactor effluent line |
| 4 | Condenser effluent line |
| 5 | Effluent line to another reactor unit |
| 6 | Effluent line to tail gas (TG) disposal |
| 7 | High pressure steam (HPS) line |
| 8,8' | Low pressure steam (LPS) line |

Liquid sulfur (S) outlet Boiler feedwater (BFW) line Timer/controller for valves

TABLE 1

Switching Sequence and Steam Production in FIG. 1 Plant

| Mode[1] | Period[2] | Reactor Position[3] Ra | Rb | Rc | Condenser Cv From/To[4] | Steam Press. | Condenser Ca From/To | Steam Press. | Condenser Cb From/To | Steam Press. | Condenser Cc From/To | Steam Press. |
|---|---|---|---|---|---|---|---|---|---|---|---|---|
| A | Claus 2 | 2 | 3 | 4 | Rv/Ra | 60 psi | Ra/Rb | 60 psi | Rb/Rc | 15 psi | Rc/TG | ** |
| A | Heat Up | 2 | 3 | 4 | Rv/Ra | Bypass | Ra/Rb | 60 psi | Rb/Rc | 15 psi | Rc/TG | ** |
| A | Plateau | 2 | 3 | 4 | Rv/Ra | Bypass | Ra/Rb | 60 psi | Rb/Rc | 15 psi | Rc/TG | ** |
| A | Heat Soak | 2 | 3 | 4 | Rv/Ra | Bypass | Ra/Rb | 60 psi] | Rb/Rc | 15 psi | Rc/TG | ** |
| C | Precool | 3 | 4 | 2 | Rv/Rc | 15 psi | Ra/Rb | 15 psi] | Rb/TG | ** | Rc/Ra | 15 psi |
| B | Claus 2 | 4 | 2 | 3 | Rv/Rb | 60 psi | Ra/TG | **[5] | Rb/Rc | 60 psi | Rc/Ra | 15 psi |
| B | Heat Up | 4 | 2 | 3 | Rv/Rb | Bypass | Ra/TG | ** | Rb/Rc | 60 psi | Rc/Ra | 15 psi |
| B | Plateau | 4 | 2 | 3 | Rv/Rb | Bypass | Ra/TG | ** | Rb/Rc | 60 psi | Rc/Ra | 15 psi |
| B | Heat Soak | 4 | 2 | 3 | Rv/Rb | Bypass | Ra/TG | ** | Rb/Rc | 60 psi] | Rc/Ra | 15 psi |

TABLE 1-continued

| | | Switching Sequence and Steam Production in FIG. 1 Plant | | | | | | | | |
|---|---|---|---|---|---|---|---|---|---|---|
| | | Reactor Position[3] | | | Condenser Cv | | Condenser Ca | | Condenser Cb | | Condenser Cc | |
| Mode[1] | Period[2] | Ra | Rb | Rc | From/To[4] | Steam Press. | From/To | Steam Press. | From/To | Steam Press. | From/To | Steam Press. |
| A | Precool | 2 | 3 | 4 | Rv/Ra | 15 psi | Ra/Rb | 15 psi | Rb/Rc | 15 psi] | Rc/TG | ** |
| C | Claus 2 | 3 | 4 | 2 | Rv/Rc | 60 psi | Ra/Rb | 15 psi | Rb/TG | ** | Rc/Ra | 60 psi |
| C | Heat Up | 3 | 4 | 2 | Rv/Rc | Bypass | Ra/Rb | 15 psi | Rb/TG | ** | Rc/Ra | 60 psi |
| C | Plateau | 3 | 4 | 2 | Rv/Rc | Bypass | Ra/Rb | 15 psi | Rb/TG | ** | Rc/Ra | 60 psi |
| C | Heat Soak | 3 | 4 | 2 | Rv/Rc | Bypass | Ra/Rb | 15 psi | Rb/TG | ** | Rc/Ra | 60 psi] |
| B | Precool | 4 | 2 | 3 | Rv/Rb | 15 psi | Ra/TG | ** | Rb/Rc | 15 psi | Rc/Ra | 15 psi] |
| A | Claus 2 | 2 | 3 | 4 | Rv/Ra | 60 psi | Ra/Rb | 60 psi | Rb/Rc | 15 psi | Rc/TG | ** |

[1] Each mode is characterized by specific flow sequence of process gas through reactors: A(Rv,Ra,Rb,Rc); B(Rv,Rc,Ra,Rb); C(Rv,Rb,Rc,Ra).
[2] Period describes operation of reactor in 2d position, except Precool occurs with freshly regenerated reactor in 3d position.
[3] Reactor position shows relative position in process stream of reactors Ra, Rb, Rc.
[4] Refers to source and destination of process gas in sulfur condenser.
[5] The steam in the shell of the condenser following the final CBA unit may be at either 15 or 60 psig or in transition. There should be no sulfur condensation in the condenser, and if it is cooled more than necessary, more fuel will be required in the incinerator, but the differences are minimal.

TABLE 1 shows steam production and operation sequences for operation of the FIG. 1 plant. In the FIG. 1 plant, reactor $R_v$ is operated only as a Claus reactor ("Claus 1") while reactors $R_a$, $R_b$, $R_c$ alternate between CBA operation and Claus operation. (Note: A reactor operated under high temperature Claus conditions including regeneration of catalyst having sulfur adsorbed is conventionally referred to as a Claus reactor; likewise, a reactor operated under CBA conditions is referred to as a CBA reactor—both Claus and CBA reactors catalyze the Claus reaction.) A reactor previously operated under CBA conditions which is being regenerated in the second position also operates as a second Claus reactor ("Claus 2"). CBA operation in the FIG. 1 plant occurs when a reactor is in the third and fourth positions. The third position reactor is generally operated as a "warm" CBA (feed temperature above 280°-300° F. or more) except during Precool period during which a reactor containing hot freshly regenerated catalyst is placed in the third postion and fed a cool gas to cool catalyst in at least the initial portion of the bed to effective CBA operating temperatures. The fourth position reactor is generally operated as a "cool" CBA reactor (feed temperature about 250°-260° F.) for maximum recovery. Regeneration in the second position concurrently with Claus 2 operation includes heat-up, plateau, and heat soak as is known to those skilled in the art (see, for example, U.S. Pat. Nos. 4,482,532 and 4,822,591 incorporated herein by reference). Precooling of a newly regenerated reactor is accomplished prior to returning a reactor to CBA operation. These steps individually are well known to those well skilled in the art, and from FIG. 1 and TABLE 1 those skilled in the art will fully understand the sequence of operations.

A preferred precooling method for the FIG. 1 plant is a "backstep," such as precooling in mode C following regeneration in Mode A and prior to switching to Mode B, as this method does not preload with sulfur a freshly regenerated reactor before it is placed under CBA conditions.

The three condensers $C_a$, $C_b$, $C_c$ in the FIG. 1 plant are tied to both low pressure (LPS) and high pressure (HPS) headers and produce either 15 psig or 60 psig steam at various times as shown in TABLE 1. This controls the effluent temperature from the condensers feeding CBA reactors during the different parts of the cycle to accomplish high sulfur recovery levels.

In TABLE 1, it can be seen that each of condensers $C_a$, $C_b$, $C_c$, of FIG. 1 must undergo a high pressure to low pressure transition (indicated by brackets) at certain points in the cycle. At the time of the transition, each such condenser is full of hot water in equilibrium with high pressure stream at 60 psig. When switched to produce into the low pressure stream header, a large portion of this water tends to flash into steam which may overload the low pressure steam system. Thus, a high pressure to low pressure transition in a condenser causes a pressure surge in the low pressure steam system. The pressure in the entire low pressure steam system increases until the excess steam can be condensed, sometimes taking several hours before the low pressure steam delivery system returns to its normal operating pressure. This pressure surge in the low pressure steam system causes the condensers connected into the low pressure steam delivery system not to provide the cooling required for feeding process gas at an optimum temperature to the CBA reactors. Moreover, the reactor in the final position is the one which previously was operated as a "warm" CBA in the third position. The resulting relatively high temperature process gas being fed to a downstream CBA reactor may result in an increase in emissions from the plant since Claus conversion decreases with increasing temperature. This increase in emissions due to relatively high temperature process gas feeding the final CBA reactor continues, often for several hours, until the condenser approaches standard low pressure steam pressure long enough for the reactor in the final position to cool down to "cool" CBA operating conditions. Moreover, the cool temperature wave moving through the catalytic reactor is slow and broad delaying return to low emissions. Further, the pressure surge in the low pressure steam system may upset processes using the low pressure steam.

Thus, the problem addressed by this invention may be described as an emissions affecting pressure surge in the low pressure steam system of the FIG. 1 plant which results when a high pressure to low pressure transition occurs on the steam side of a sulfur condenser and causes the condenser to fail to provide adequate cooling of process gas for a final CBA reactor. Another aspect of the problem is that the surge in the low pressure steam system can cause other condensers connected to the low pressure steam system to fail to provide adequate cooling for CBA reactors. Another aspect of the problem is that the pressure surge in the low pressure line may upset processes using the low pressure steam. Since the FIG. 1 plant otherwise provides highly satisfactory performance (the use of three alternative Claus/CBA reactors provides the highest sulfur recovery of known extended Claus plants), it is desirable to retain the plants advantageous features, including production of high pressure and low pressure steam, while solving this problem in its different aspects.

However, it has been difficult to inexpensively solve this problem because of the large volume of steam generated by a sulfur condenser when the condenser is switched. An auxiliary condenser can be added downstream of each of condensers $C_a$, $C_b$, and $C_c$ to produce low pressure steam, with process gas flowing through each auxiliary condenser only when lower effluent temperatures are required for feed to a CBA reactor; and, at other times, the process gas bypasses the auxiliary condensers. Condensers, however, are large and more expensive then reactors, and such a solution greatly increases the cost and decreases the economic applicability of a plant.

An object of the invention is to provide an improved extended Claus process and plant of the type having at least three reactors each periodically operated alternately under Claus and CBA conditions. Another object of the invention is to provide such an improved process and plant in which a high pressure to low pressure transition in a condenser connected to a low pressure steam delivery system does not cause an emissions affecting pressure surge in the low pressure steam system. Other objects and advantages will appear from the following description and the claims.

THE INVENTION

According to the invention, a high pressure to low pressure transition in a sulfur condenser connected into a low pressure steam system, which results in a relatively high temperature process gas being provided to a final Claus catalytic reactor operated under CBA conditions, is prevented from causing an increase in sulfur emissions. The condenser transition is accomplished in a non-emissions affecting position at a rate effective for allowing other condensers in the low pressure steam system to provide effective cooling of process gas to prevent an increase in emissions and by maintaining in the final position a reactor with a catalyst bed sufficiently cold to absorb heat in process gas without an increase in sulfur emissions from the plant being fed thereto while a newly regenerated reactor is being cooled to CBA conditions in a next-to-final position. Before a warm temperature front moving through the catalyst bed of the final reactor breaks through the now cooled-to-CBA-conditions reactor is placed in the final position.

DETAILED DESCRIPTION OF THE INVENTION

Figure 1:
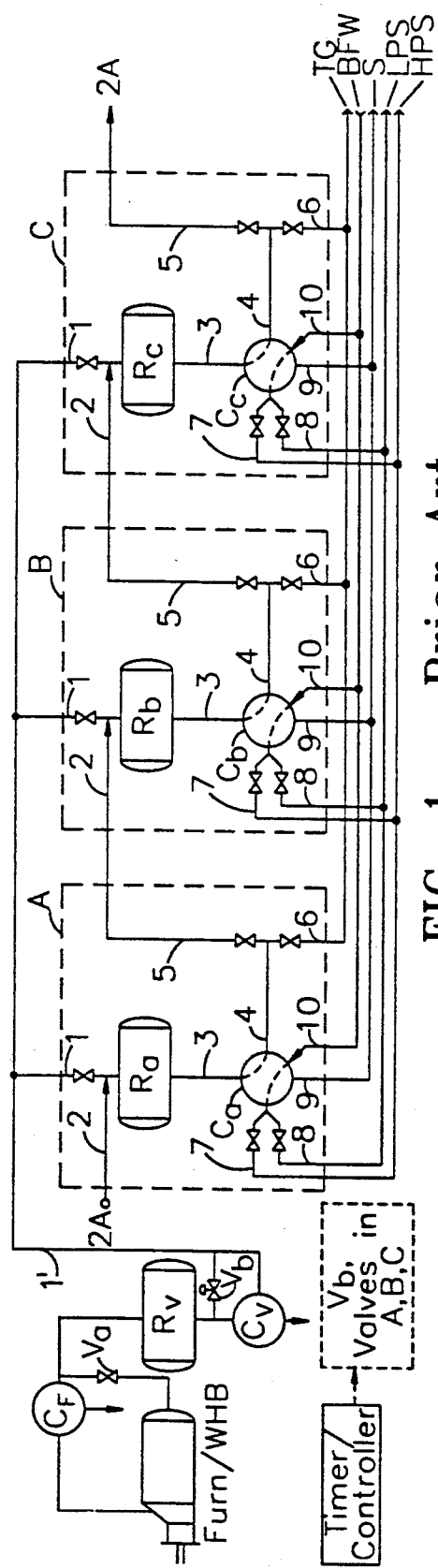
FIG. 1, labeled PRIOR ART, represents an extended Claus process plant having at least three reactors periodically alternated between operation under high temperature Claus conditions and under CBA conditions.

In the FIG. 1 plant, at the end of the Heat Soak Period the reactor in the second position is hot and fully regenerated, the reactor in the third position is on adsorption as a "warm" CBA reactor (feed temperature 280°-300° F. or warmer), and the reactor in the final position is on adsorption as a "cool" CBA reactor (feed temperature 260°-280° F.). The hot Claus catalyst in the second position reactor must be cooled prior to switching the reactor to the final position as overall sulfur recovery is largely a function of the temperature of that portion of catalyst within the final reactor in which Claus reaction occurs. During Precool, therefore, the hot newly regenerated catalyst is placed in the third position for a limited period of time for cooling. At the same time, the "warm" CBA reactor which had been in the third position is switched to the final position, and the cool CBA reactor which had been in the final position is switched to the second position (for example, Mode C). High emissions will result in this period if the warm reactor in the final position is maintained warm. It must be cooled to "cool" CBA operating conditions to keep the sulfur emissions at a minimum. During Precool, however, the condenser feeding the reactor in the final position is the one which was making high pressure steam during the previous Heat Soak period when it fed gas to the same reactor in the third ("warm" CBA) position. To keep emissions at a minimum, at the beginning of the Precool period, this condenser must very quickly be switched to low pressure steam. Prior to switching, the hot water in this condenser is in equilibrium with steam at the higher pressure. Reducing the pressure in this condenser causes a significant fraction of this water to flash to steam at the lower pressure in order to maintain the thermodynamic equilibrium. The amount of steam thus produced is nearly independent of the rate at which the pressure in the vessel is reduced. If the condenser is suddenly connected to the low pressure steam header, the total amount of steam that would be produced from the hot water will be produced very quickly, and the steam rate produced into the low pressure steam header will be very large. In fact, it may well be so large that the users of low pressure steam on this header cannot use the steam fast enough and the pressure within the header will increase. A new thermodynamic equilibrium will be reached as the switch is made from an isolated hot high pressure condenser and a low pressure steam header to a combined system with the condenser connected to the steam header. A higher pressure in the low pressure steam header means the temperature of the steam within it will also increase. This means that the condenser being switched and the other condensers producing steam into this header will do a less efficient job of cooling and those pieces of equipment which use the low pressure steam will suddenly receive a hotter steam which may result in upsets of the control system. A solution would be to very slowly bleed pressure from the condenser being switched from high pressure to low pressure operation into the low pressure steam header at such a rate that the amount of additional steam going into it from the reduction of the pressure on the hot water is insufficient to increase the pressure within the steam header. However, when this is done for the FIG. 1 plant, the gas feeding the final CBA reactor is too warm and a period of high sulfur emissions results.

According to the invention, the FIG. 1 plant in which a high pressure to low pressure transition occurs is improved by the addition of means for allowing the condenser undergoing a high pressure to low pressure transition to be placed in a position where the transition can be accomplished at a rate effective for not causing an emissions affecting pressure surge, in combination with means for maintaining a sufficiently cold CBA reactor in final position for absorbing heat from a relatively high temperature process gas feed without an increase in emissions, and in combination with means for placing a cooled CBA reactor in final position before a warm front breaks through the final reactor. These improvements are effected by the addition of valved lines 11 to the FIG. 1 plant and by the use of controller/timer 13 in accordance with the description herein and particularly in accordance with the sequence of operations of TABLE 2 herein.

Figure 2:
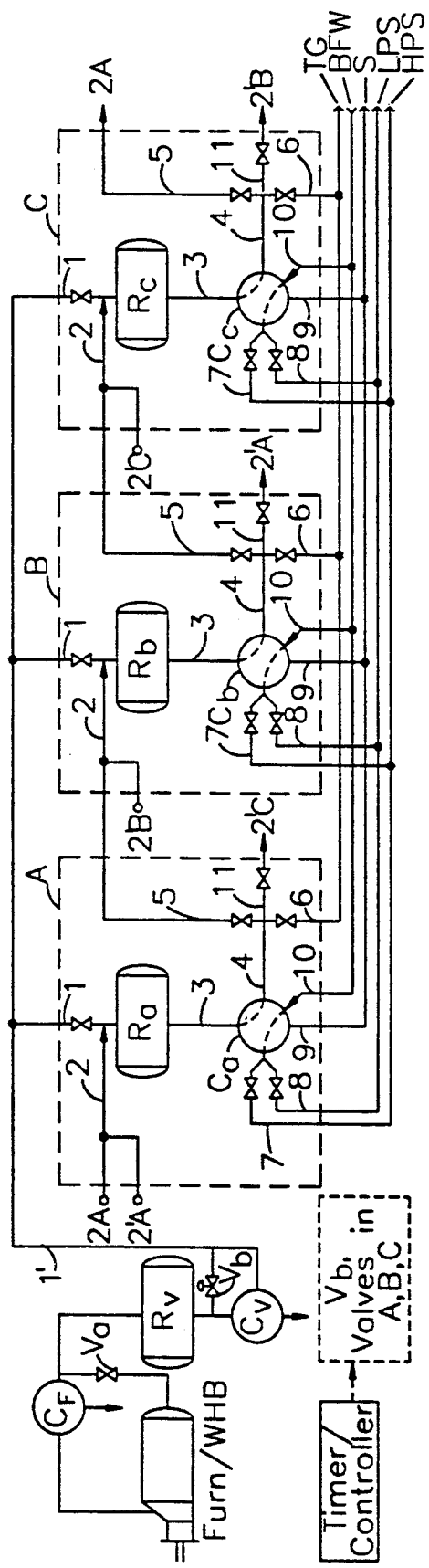
FIG. 2 illustrates an improved extended Claus process and plant in accordance with the invention.

In the FIG. 2 plant (see for example, Mode A in TABLE 2) during Heat Soak, the reactor in the second position is hot and fully regenerated, the reactor in the third position is on adsorption as a "warm" CBA reactor, and the reactor in the final position is on adsorption as a "cool" CBA reactor. The hot reactor in the second position is cooled prior to switching to the final position by being placed in the third position for a limited period of time to do the cooling. However, valved lines 11 allow the reactors in the second and third positions to be switched while leaving the "cool" CBA reactor in the final position. Because the reactor in the final position is cool, it can be fed a warm feed for a limited time and still maintain a high recovery, as it takes time for the wave of relatively warmer temperatures to move through the reactor. As in the FIG. 1 plant, during Precool, the condenser prior to the reactor in the final position in the FIG. 2 plant is the one which was making high pressure steam during the Heat Soak period when it fed gas to the reactor in the third ("warm" CBA position) position. During Precool, provided the Precool time period is less than the time required for the heat wave caused by feeding the warm gas to the cool final reactor to move through the reactor and warm it all, the condenser prior to the final reactor during the Precool period may continue to make high pressure steam. Just as the heating wave is moving through the "cool" final CBA reactor, a cooling wave is moving through the hot reactor in the third position. The temperature waves will move through the reactors at near the same rate. It is not necessary for the reactor in the third position to be fully cooled prior to switching it to the final position for the next period. Only that portion of the catalyst required for the Claus reaction to occur must be cool; the portion of the catalyst near the reactor outlet may still be quite warm. Thus, the switch can be made before the heating wave has completely moved through the final reactor. TABLE 2 shows 60 psi steam being produced in the condenser prior to the reactor in the final position during the Precool period; however, this requires explanation. The pressure will be 60 psi in this condenser at the start of this period, but it is tied into the low pressure steam header and the pressure very slowly dropped throughout the Precool period as well as throughout the following Claus 2, Heat Up, Plateau, Heat Soak, and Precool periods so that at the beginning of the next Claus 2 period it will be making the low pressure steam (15 psi on TABLE 2) that will be required to furnish a cool feed to the reactor in the final position at that time. This very long time period will allow a reduction in the pressure of the condenser over many hours and thereby prevent the sudden production of steam and resultant pressure and temperature increase in the low pressure steam header, all the while keeping the sulfur emissions low.

Referring again to FIG. 1, it can be seen that the FIG. 1 plant is constrained by its piping and is unable when in mode A to interchange, for example, units A and B while keeping unit C in final position; or when in mode B, is unable to interchange units B and C while keeping unit A in final position; or when in mode C, is unable to interchange units C and A while keeping unit B in final position. However, by addition of valved lines 11 as shown on FIG. 2, reactor effluent from A can be fed to either of units B or C; from B can be fed to either of units A or C; and from C can be fed to either of units A or B, permitting operation using timer/controller 13 in accordance with the invention.

Referring now to TABLE 2, it can be seen that a high pressure to low pressure transition still occurs in a plant operated in accordance with the invention, but at a rate effective to allow the low pressure steam system to accommodate increased steam production without affecting emissions; and that an already cold reactor is maintained in the final position to absorb increased temperature of process gas while a newly regenerated reactor is being cooled in next-to-final position to effective CBA conditions. In mode A, reactor $R_c$ is maintained in the final position during the precool period; in mode B, reactor $R_a$ is maintained in the final position during the precool period; and in mode C, reactor $R_b$ is maintained in the final position during the precool period.

The invention is directed to solution of a particular problem in a particular type of extended Claus sulfur recovery plant. The plant is one in which three reactor/condenser units are alternated between Claus and CBA operation, in which a condenser periodically undergoes a high pressure to low pressure transition, in which the transition affects recovery due to a relatively warm feed being fed to a warm final CBA reactor, in which temperature effects in other condensers results due to being tied via a steam delivery system to the condenser undergoing the transition; and in which a plant produces both high pressure and low pressure steam. The invention permits retaining the capabilities of this plant in maximized production of high pressure and low pressure steam while avoiding increases in emissions which result from the high pressure to low pressure transition and while not upsetting the low pressure steam system.

The invention has been described in terms of specific and preferred embodiments, but is not limited thereto but by the following claims interpreted according to applicable principles of law.

TABLE 2

| | | Switching Sequence and Steam Production in FIG. 2 | | | | | | | | | |
|---|---|---|---|---|---|---|---|---|---|---|---|
| | | Reactor Position[3] | | | Condenser C2 | | Condenser C3 | | Condenser Cb | | Condenser Cc | |
| Mode[1] | Period[2] | Ra | Rb | Rc | From/To[4] | Steam Press. | From/To | Steam Press. | From/To | Steam Press. | From/To | Steam Press. |
| A | Claus 2 | 2 | 3 | 4 | Rv/Ra | 60 psi | Ra/Rb | 60 psi | Rb/Rc | 15 psi | Rc/ TG | ** |
| A | Heat Up | 2 | 3 | 4 | Rv/Ra | Bypass | Ra/Rb | 60 psi | Rb/Rc | 15 psi | Rc/ TG | ** |
| A | Plateau | 2 | 3 | 4 | Rv/Ra | Bypass | Ra/Rb | 60 psi | Rb/Rc | 15 psi | Rc/ TG | ** |
| A | Heat Soak | 2 | 3 | 4 | Rv/Ra | Bypass | Ra/Rb | 60 psi | Rb/Rc | 15 psi | Rc/ TG | ** |
| — | Precool | 3 | 2 | 4 | Rv/Rb | 15 psi | Ra/Rc | 60 psi | Rb/Ra | 15 psi | Rc/ TG | ** |
| B | Claus 2 | 4 | 2 | 3 | Rv/Rb | 60 psi | Ra/TG | **[5] | Rb/Rc | 60 psi | Rc/ Ra | 15 psi |
| B | Heat Up | 4 | 2 | 3 | Rv/Rb | Bypass | Ra/TG | ** | Rb/Rc | 60 psi | Rc/ Ra | 15 psi |

TABLE 2-continued

Switching Sequence and Steam Production in FIG. 2

| Mode[1] | Period[2] | Reactor Position[3] | | | Condenser C2 | | Condenser C3 | | Condenser Cb | | Condenser Cc | |
|---|---|---|---|---|---|---|---|---|---|---|---|---|
| | | Ra | Rb | Rc | From/To[4] | Steam Press. | From/To | Steam Press. | From/To | Steam Press. | From/To | Steam Press. |
| B | Plateau | 4 | 2 | 3 | Rv/Rb | Bypass | Ra/TG | ** | Rb/Rc | 60 psi | Rc/Ra | 15 psi |
| B | Heat Soak | 4 | 2 | 3 | Rv/Rb | Bypass | Ra/TG | ** | Rb/Rc | 60 psi | Rc/Ra | 15 psi |
| — | Precool | 4 | 3 | 2 | Rv/Rc | 15 psi | Ra/TG | ** | Rb/Ra | 60 psi | Rc/Rb | 15 psi |
| C | Claus 2 | 3 | 4 | 2 | Rv/Rc | 60 psi | Ra/Rb | 15 psi | Rb/TG | ** | Rc/Ra | 60 psi |
| C | Heat Up | 3 | 4 | 2 | Rv/Rc | Bypass | Ra/Rb | 15 psi | Rb/TG | ** | Rc/Ra | 60 psi |
| C | Plateau | 3 | 4 | 2 | Rv/Rc | Bypass | Ra/Rb | 15 psi | Rb/TG | ** | Rc/Ra | 60 psi |
| C | Heat Soak | 3 | 4 | 2 | Rv/Rc | Bypass | Ra/Rb | 15 psi | Rb/TG | ** | Rc/Ra | 60 psi |
| — | Precool | 2 | 4 | 3 | Rv/Ra | 15 psi | Ra/Rc | 15 psi | Rb/TG | ** | Rc/Rb | 60 psi |
| A | Claus 2 | 2 | 3 | 4 | Rv/Ra | 60 psi | Ra/Rb | 60 psi | Rb/Rc | 15 psi | Rc/TG | ** |

[1]Each mode is characterized by specific flow sequence of process gas through reactors: A(Rv,Ra,Rb,Rc); B(Rv,Rc,Ra,Rb); C(Rv,Rb,Rc,Ra).
[2]Period describes operation of reactor in 2d position, except Precool which occurs with reactor in third position being cooled.
[3]Reactor position shows relative position in process stream of reactors Ra, Rb, Rc.
[4]Refers to source and destination of process gas in sulfur condenser.
[5]The steam in the shell of the condenser following the CBA unit may be at either 15 or 60 psig or in transition. There should be no sulfur condensation in this condenser, and if it is cooled more than necessary, more fuel will be required in the incinerator, but the differences are minimal.

What is claimed is:

1. In operation of a Claus process plant having at least first, second, and third Claus catalytic reactors with associated downstream first, second, and third condensers respectively associated therewith, each condenser being periodically switched from a first pressure steam delivery system to a second pressure steam delivery system, the first pressure being higher than the second pressure, each catalytic reactor periodically being alternated between high temperature Claus operation and cold bed absorption operation at a first temperature and cold bed absorption at a second temperature lower than the first temperature, the steps comprising:

as a condenser is being switched from the first pressure steam delivery system to the second pressure steam delivery system and during a period of time in which said condenser is undergoing a high pressure to low pressure transition, switching said condenser to a position where the high pressure to low pressure transition can be accomplished at a rate effective for avoiding a pressure surge in the second pressure steam delivery system causing an increase in sulfur emissions from the plant;

providing a CBA reactor in final position for absorbing heat from condenser effluent having a temperature greater than that of catalyst in the CBA reactor; and interchanging next to final and final CBA reactors prior to the time for a warm front due to thus absorbed heat breaking through catalyst in said final position reactor and causing an increase in sulfur emissions.

2. In operation of a Claus process plant having at least first, second, and third Claus catalytic reactors with associated downstream first, second, and third condensers respectively associated therewith, each condenser being periodically switched from a first pressure steam delivery system to a second pressure steam delivery system, the first pressure being higher than the second pressure, each catalytic reactor periodically being alternated between high temperature Claus operation and cold bed adsorption operation at a first temperature and cold bed adsorption operation at a second temperature lower than the first temperature, the steps comprising:

as a condenser is being switched from the first pressure steam delivery system to the second pressure steam delivery system and during a period of time in which said condenser is undergoing a high pressure to low pressure transition, switching said condenser to a position where the high pressure to low pressure transition can be accomplished at a rate effective for avoiding a pressure surge in the second pressure steam delivery system causing an increase in sulfur emissions from the plant;

cooling a newly regenerated reactor in next-to-final position to effective CBA conditions;

providing a CBA reactor in final position for absorbing heat from condenser effluent having a temperature greater than that of catalyst in the CBA reactor, said CBA reactor being effective for absorbing heat and for preventing an increase in emissions for a period of time prior to a warm front due to absorption of heat breaking through the reactor; and interchanging next to final and final CBA reactors prior to the time for the warm front due to absorption of heat breaking through catalyst bed in said final position reactor and causing an increase in sulfur emissions.

3. In a Claus process sulfur recovery plant comprising three Claus catalytic reactors, each with a downstream sulfur condenser, each sulfur condenser being alternated between high pressure and low pressure steam delivery systems, each catalytic reactor being alternated between operation under high temperature Claus conditions and operation under CBA (cold bed adsorption) conditions, the combination of:

means for switching a condenser undergoing a high pressure to low pressure transition to a position where the transition can be accomplished at a rate effective for avoiding a pressure surge in the second pressure steam delivery system causing an increase in sulfur emissions from the plant;

means for maintaining a CBA reactor in final position for absorbing heat from condenser effluent having a temperature greater than that of catalyst in the CBA reactor, the absorption of heat causing a warm front to move through the CBA reactor means for switching another CBA reactor in final position prior to breakthrough of a warm front through said CBA reactor; and said CBA reactor being effective for preventing an increase in sulfur emissions prior to said warm front breakthrough.

* * * * *

UNITED STATES PATENT AND TRADEMARK OFFICE
CERTIFICATE OF CORRECTION

PATENT NO. : 5,141,733
DATED : August 25, 1992
INVENTOR(S) : Pendergraft, et al

It is certified that error appears in the above-indentified patent and that said Letters Patent is hereby corrected as shown below:

| Col. | Line | |
|------|------|---|
| 10 | 29 | "next-tofinal" should read --next-to-final-- |

Signed and Sealed this

Twenty-sixth Day of October, 1993

Attest:

BRUCE LEHMAN

Attesting Officer   Commissioner of Patents and Trademarks